United States Patent Office 3,564,848
Patented Feb. 23, 1971

3,564,848
STEERING EQUIPMENT PARTICULARLY FOR HEAVY VEHICLES
Johannes Vagn Baatrup, Sonderborg, and Vagn S. L. Bender, Nordborg, Denmark, assignors to Danfoss A/S, Nordborg, Denmark, a corporation of Denmark
Filed May 8, 1969, Ser. No. 822,986
Claims priority, application Germany, May 3, 1968,
P 17 55 387.6
Int. Cl. F15b 15/18
U.S. Cl. 60—52                    11 Claims

ABSTRACT OF THE DISCLOSURE

The invention relates to a hydrostatic steering system for heavy vehicles. The system comprises dual units in series with one unit being a working unit and the other unit being a control unit. Each unit incorporates change-over and shut-off valve means and metering means. A steering wheel actuates the control unit and the metering means of the control unit actuates a control motor which in turn actuates the metering means of the working unit. The metering means of the working unit actuates a working motor connected to the steering linkage of the vehicle.

---

Figure 1:
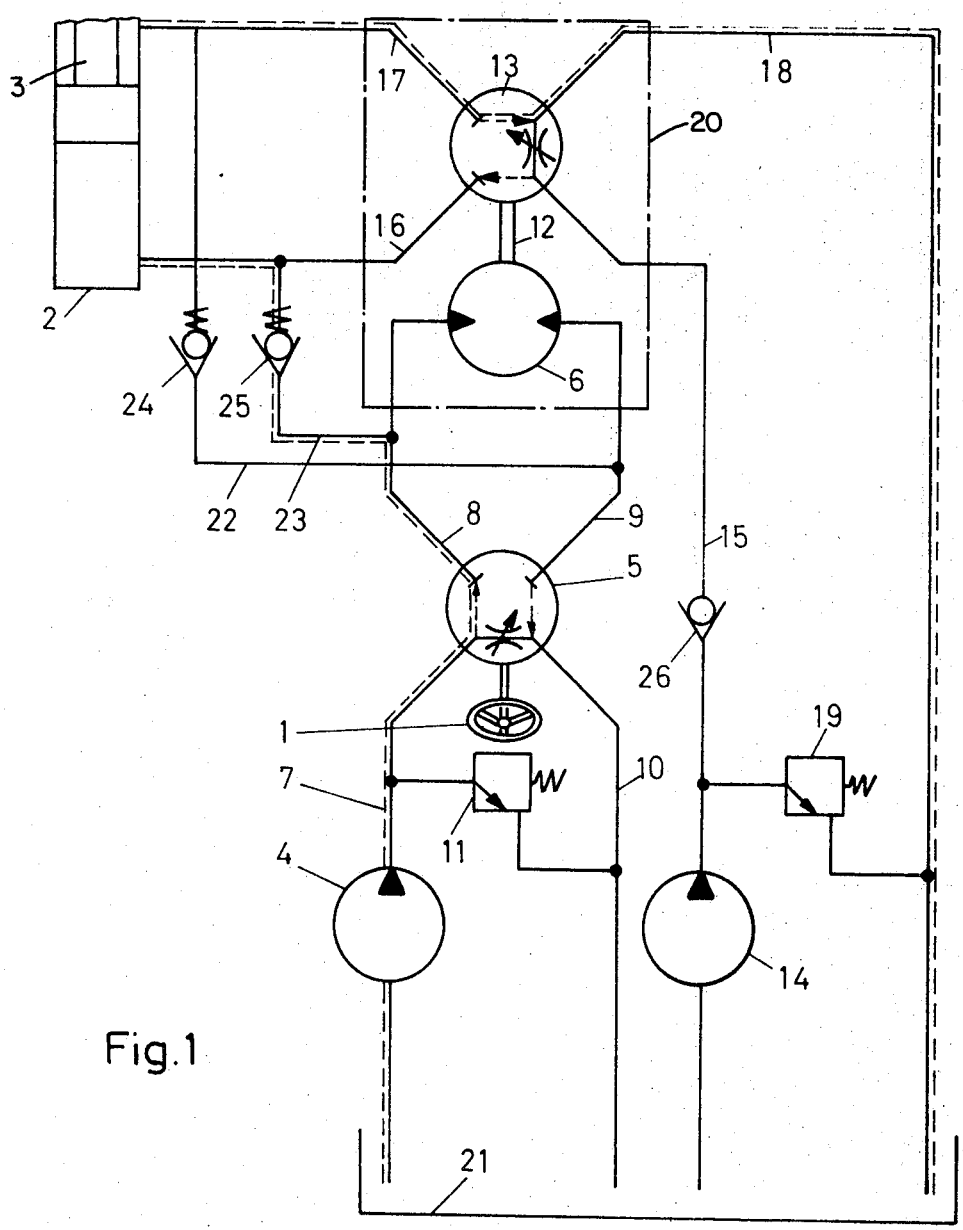

The invention relates to steering equipment, particularly for heavy vehicles, comprising a hydrostatic system, consisting of a motor, a control part incorporating a change-over and shut-off valve and a metering device, and of an actuating device, the actuating device being adapted to act upon the control part, so that when it is actuated, fluid under pressure is passed to and from the motor in the required direction and is meter by the metering device.

Various constructions of such hydrostatic steering equipment is known. In one arrangement (U.S. Pat. Re. 25,126) the change-over and shut-off valve takes the form of a rotary slide, one sleeve of which is connected with the steering wheel and the other with the rotor of a metering motor. When the steering wheel is turned, the valve opens in the required direction. It remains open until so much fluid under pressure has passed by way of the metering motor to the working motor that the second sleeve follows the rotation of the first sleeve. In another arrangement (U.S. Pat. 2,020,951) the steering wheel is connected to a metering pump. The shut-off and change-over valve opens in the required direction and remains open if and for as long as there is a pressure-difference between the valve and the pump. A further usual feature in these systems is that if the pressure pump fails, the metering device can be turned manually with the help of the steering wheel and emergency steering can be carried out in this manner.

Difficulties arise, however, if working motors having a large displacement volume, such as required in particular for heavy vehicles, are to be controlled. If the steering equipment is simply increased in size in proportion to the size of the working motor, it becomes large, heavy and clumsy. If a metering pump is connected to the steering wheel, considerable strength is required on the part of the driver to produce the pressure-differential for actuating the change-over and shut-off valve. In any case the force that the driver can apply is not sufficient for manual displacement of the wheels to be steered when a case of emergency steering arises. If the steering equipment is kept at its normal size, however, a complete revolution of the steering wheel results in only a very small displacement of the steered wheels. In particular, it is no longer possible, by means of a few, e.g. three, revolutions of the steering wheel, to move these wheels from the position in which they are fully deflected to the left, to the position in which they are fully turned to the right. The provision of a step-up gear connected to the steering wheel likewise causes difficulties, since for emergency steering and, for normal operation too when a metering pump is used, impermissibly large forces would have to be applied.

The object of the invention therefore is to provide steering equipment of the initially described kind, which, despite the use of a large working motor, can be actuated with normal power and wherein the relationship between the angle of rotation of the actuating device, e.g. the steering wheel, and the deflection of the controlled means, e.g. the steered wheels, is normal.

According to the invention, this object is achieved by arranging two hydrostatic systems one behind the other, by the working motor of the first system forming the actuating device and acting on the control part of the second system, and by the working motor of the second system being connected with the parts to be steered.

In this arrangement of one unit behind the other, the quantity of fluid under pressure passed to the working motor of the second system is proportional to the quantity of liquid under pressure flowing through the metering device of the first system, but it may be considerably greater. The force used at the second system can be small; consequent upon the use of fluid under pressure, sufficient power is available for actuating the second system. Thus, a large or small metering motor can be used in the second system, but a metering motor that rotates very rapidly can be provided or some other step taken to utilize the large quantity of fluid passed from the working motor, without counteraction of the force to be applied to the steering wheel. The procedure adopted in the case of emergency steering will be explained in detail below. In any case, with the second system bridged, the first system can be caused to act directly on the working motor of the second system so that displacement of this working motor can be achieved using a still reasonable amount of force.

It is particularly advantageous if the working motor of the first system is a rotary motor. Its output shaft can then engage directly at a point in the second system where the steering wheel is otherwise connected.

In a preferred embodiment, the two hydrostatic systems contain at least one step-up means which increases the amount of fluid passed by the second system for each revolution of the actuating device of the first system. As a result of the stepping-up, a relatively small metering device suffices for the second system, and this is a better arrangement than the likewise possible use of larger and heavier components for this purpose.

The step-up means can be provided at one or more points in the two systems. Expediently, care should be taken in the first system that the stepping up does not increase the force required for actuation to an impermissibly great extent. There is, however, no objection to the stepping up being achieved—as in the manner already known in the case of steering equipment having a single hydrostatic system—by using a rotary piston engine as the metering device the rotor of which is rotated by the actuating device and the displacement volume of which per revolution of the rotor is a multiple of the volume of the displacement chambers, which multiple corresponds to the number of teeth.

Furthermore, a hydraulic step-up arrangement can be provided between the control part and the working motor of the first system, such that the output angles of rotation of the last-mentioned working motor are greater than the angles of rotation of the actuating device of the first system. Since the fluid under pressure is already acting in this part of the first system, this step-up arrangement is largely independent of the manual force applied.

A mechanical step-up gear can also be fitted in advance of the metering device of the second system. Furthermore, the last-named metering device can comprise a rotary piston engine with volume step-up means.

A very simple construction is achieved if both metering devices comprise a rotary piston engine with volume step-up means and the working motor of the first system is directly connected to the input shaft of the second system. A further step-up gear is then not necessary and extremely high step-up ratios can then be achieved. If each of the two metering devices has a step-up ratio of 1:7, a total step-up ratio of 1:49 is obtained. If the volume of the chamber of the metering device of the second system is twice that of the metering device of the first system, a total step-up ratio of almost 1:100 is obtained.

Manufacture is rendered easier if the metering devices of both systems are rotary piston engines having toothed wheels of like peripheral shape. These rotary piston engines can then be manufactured in a series so that there is adequate possibility for varying the width of the rotary pistons to provide a larger volume of chamber in the metering device of the second system. It is also feasible for the diameters of the components required for the second system to be no greater than those of the first system.

Expediently, a separate feed pump is associated with each hydraulic system. In particular, the pump for the second system can be fitted in the vicinity of the working motor and of the control part of the second system. Very short pipes, in which losses are low, can then be used for the large quantities of fluid. The use of two feed pumps normally causes no difficulties either, since heavy vehicles normally have at least two pump systems. Furthermore, the possibility is provided of at least one pump still being available in cases of emergency. If the pump of the first system fails, the working motor of the first system can be turned manually through the first system, and the second system thus actuated. If the pump of the second system fails, the working motor of the first system, due to the fluid under pressure present therein, has sufficient power to move the oil through the second system even without the oil being under pressure.

In the last-mentioned case and also when no pumping capacity is available at all, fluid under pressure can be passed directly to the working motor of the second system by way of the metering device of the first system, the metering device serving as a pump operated solely by hand. Here, it is expedient however, to provide a check valve in the pipe running to the second system, so that the pressure oil, passed manually, does not instead flow away into the working motor through the control part of the second system, which, when the actuating device of the first system is rotated, is displaced by the working motor thereof. In the simplest case all that is necessary for this emergency steering is simply to connect each connecting pipe of the working motor of the first system with a connecting pipe of the working motor of the second system by way of a check valve that opens towards the second system.

Expediently, the two feed pumps should have a common sump, so that connections can be used whereby oil is passed from one system into the other. It is of course, also possible to operate with a single pump if a quantity-divider, which divides the fluid under pressure between the two systems, is fitted to the rear of the single pump.

Figure 2:
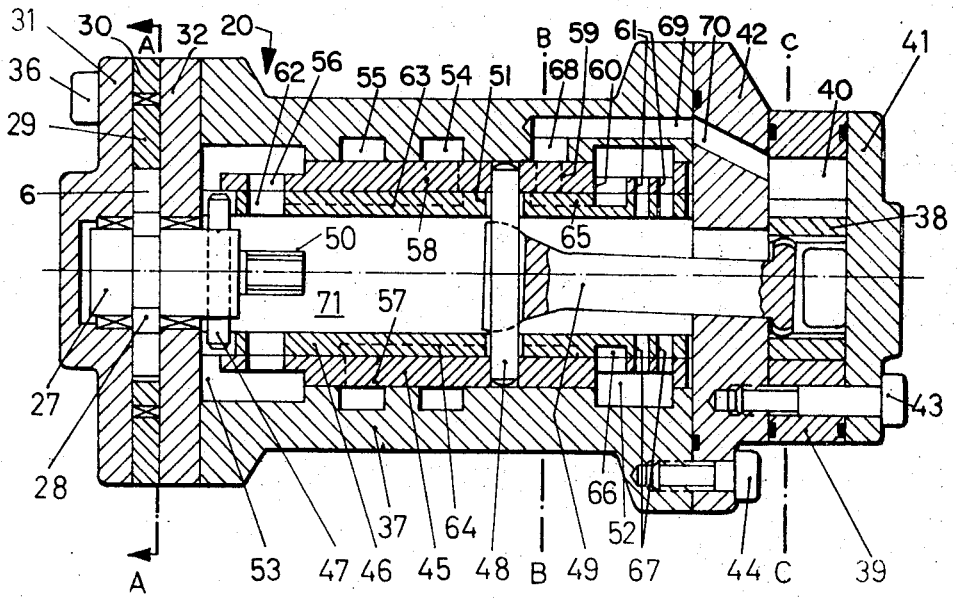
Figure 6:
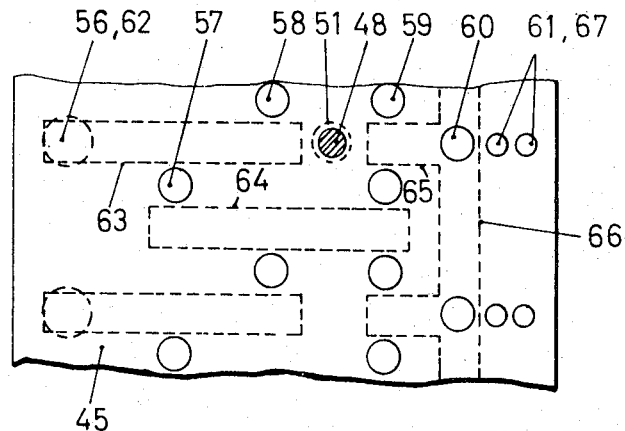
Figure 3:
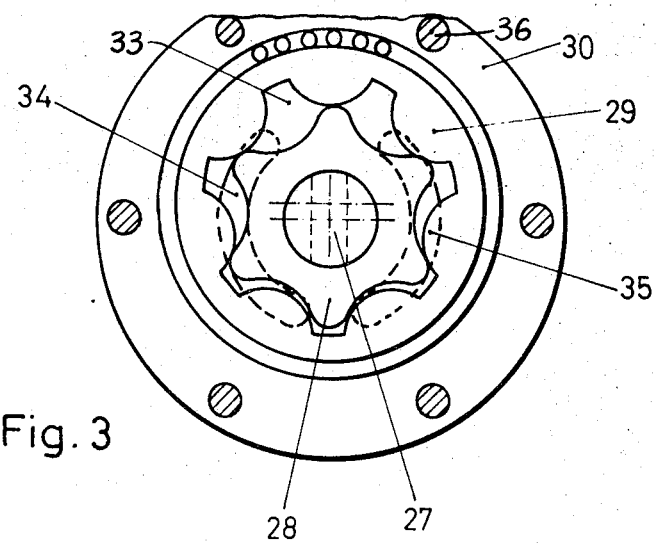
Figures 4, 5:
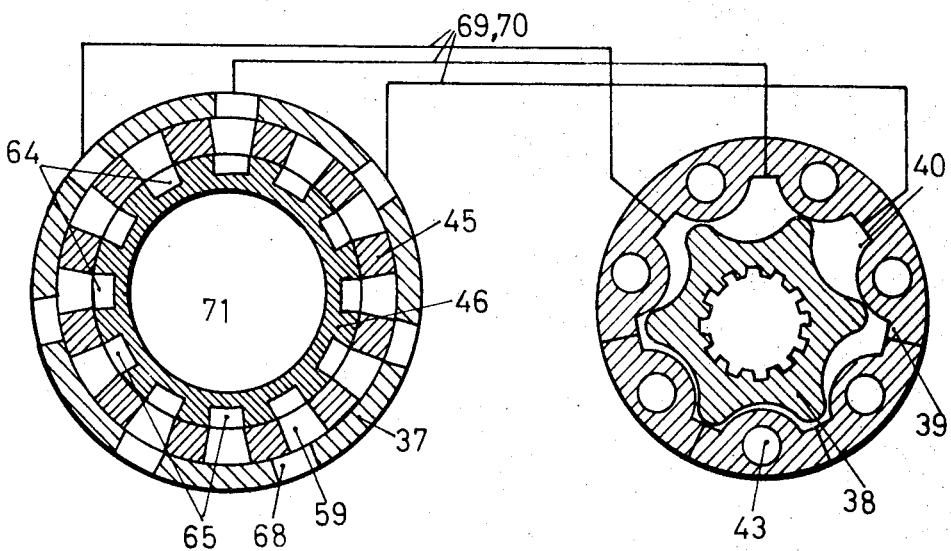

The invention will now be described in more detail by reference to an embodiment illustrated in the drawing, wherein:

FIG. 1 shows the connection diagram for steering equipment in accordance with the invention, FIG. 2 shows a longitudinal section through a component in which the working motor of the first system and the control part of the second system are combined, FIG. 3 is a cross-section on the line A—A of FIG. 2, FIG. 4 is a schematic cross-section, not true to scale, on the line B—B in FIG. 2, the valve being turned in a working position, FIG. 5 is a schematic cross-section, not true to scale, on the line C—C of FIG. 2, and FIG. 6 shows a developed view of part of the valve.

In the steering system of FIG. 1, a large working motor 2 is to be actuated with the help of a steering wheel 1, wheels, for example, being linked to the piston-rod 3 of the motor.

For this purpose, there is provided a first hydrostatic system which comprises a pump 4, a control part 5 and a rotary working motor 6. The control part is only shown schematically. It incorporates a change-over and shut-off valve, which enables the pressure pipe 7 to be connected as required with one of the two connecting pipes 8 or 9 and the discharge pipe 10 to be connected to the other connecting pipe, i.e. the pressure pipe 7, in the neutral position, to be connected directly to the discharge pipe 10 by way of a by-pass. The control part also incorporates a motor which meters the quantity of fluid flowing to the working motor 6 and which caters for the angle of rotation of the working motor 6 being proportional to the angle of rotation of the steering wheel 1. A relief valve 11 is fitted between the pressure pipe 7 and the discharge pipe 10.

Through its output shaft 12, the working motor of the first system actuates the control part 13 of a second system, which is constructed in precisely the same manner as the control part 5 of the first system. It is thus able selectively to pass fluid under pressure, supplied by a pump 14, through a pressure pipe 15, into one of the two connecting pipes 16 or 17 and to connect the other connecting pipe to the discharge pipe 18, i.e., to connect the two pipes 15 and 18 directly to each other in the neutral position. This control part also incorporates a metering motor which caters for the displacement of the working motor 2 being proportional to the rotation of the actuating shaft 12. A relief valve 19 is also connected between the pipes 15 and 18.

The working motor 6 and the control part 13 are accommodated in a common unit 20. The two systems have a common sump 21.

Also provided are two pipes 22 and 23 which connect the connecting pipes 8 and 9 respectively of the first system to a connecting pipe 16 and 17 of the second system. The two pipes 22 and 23 each contain a check valve 24 and 25 respectively which open in the direction of the second system.

When, in operation, the steering wheel is turned through a certain angle, the working motor 6, under the influence of the fluid under pressure of the first system, follows this movement and is displaced through a proportionally great angle. Expediently the angle of rotation of the output shaft 12 is a multiple of the angle of rotation of the steering wheel 1. The control part 13 is correspondingly displaced, with sufficient force and speed, by the output shaft 12. The working motor 2 follows this displacement in a proportional manner. The metering motor of the control part 13 can, within reasonable limits, be made as large as required or be caused to rotate as rapidly as required, since no manual force is required for its actuation. The larger quantity of fluid that flows through can be catered for by larger pipe and bore cross-sections. A particular advantage is that, due to the stepping up that occurs between the first and second systems, the unavailable lost-motion angle determinable at the steering wheel can be reduced, i.e. a greater flow cross-section is uncovered at the control part of the second system when the angle of rotation of the steering wheel corresponds to the previous lost-motion angle.

If the pump 4 fails, the working motor 6 can be manually displaced in the usual way by turning the steering wheel 1 and the second system can thus be actuated.

If the pump 14 fails, then the working motor 6 of the first system has sufficient power to drive the metering motor of the second system and to use this as a pump for displacing the working motor 2. A further possibility consists in the fact that the fluid under pressure from the first system can be caused to act directly on the working motor 2. As shown by the broken line, the pressure oil then flows through one of the check valves 24 or 25 and returns through the control part 13 and the discharge pipe 18 of the second system. To prevent the pressure oil from flowing through the pressure pipe 15 without being used, a check valve 26 is provided in this pressure pipe. If both pumps should fail, oil can still be passed to the working motor 2 with the help of the steering wheel 1 and the metering motor of the control part 5, so that it is still possible at least to effect a very slow displacement.

The unit 20 is illustrated in FIG. 2 in longitudinal section. Located at the left-hand end is the working motor 6, which incorporates a toothed wheel 28, mounted on a shaft 27, and an eccentrically arranged toothed ring 29, which rotates in an eccentric ring 30. The shaft is mounted in a cover 31 and a disc 32, which also seal the pump chambers 33 at the side. The cover 31 also carries ports for the connecting pipes 8 and 9 and feed grooves 34 and 35 communicating therewith. The parts 30, 31 and 32 are connected by screw-bolts to a tubular housing 37.

Located at the right-hand end of the housing is the metering motor in the form of a gerotor. It has a toothed wheel 38, which can rotate in a fixed toothed ring 39. The toothed wheel has one tooth fewer than the toothed ring. Chambers are formed between these two elements these chambers being bounded on one side by a cover 41 and on the other by a channel disc 42. The centre point of the toothed wheel 38 moves over a circular path. For each complete circular movement, however, the toothed wheel moves on only to the extent of the distance between two teeth. The parts 39, 41 and 42 are interconnected by screw-bolts 43. The disc 42 is secured to the housing 37 by screw-bolts 44.

An outer rotatable sleeve 45 and an inner rotatable sleeve 46 are provided in the housing. The inner sleeve is connected by means of a pin 47 to the shaft 27 so that it rotates therewith, and the outer sleeve is connected by means of a pin 48 and a universal joint shaft 49 to the toothed wheel 38 so that it rotates with this wheel. A spring 50 holds the two sleeves in a predetermined neutral position (FIG. 6). They can be brought into a working position (FIG. 4) by overcoming the force of the spring. In the extreme case, the pin 48, secured in the outer sleeve 45, lies against the wall of the bore 51 of the inner sleeve 46, so that a positive mechanical rotary connection is established between the working motor 28, 29 and the metering motor 38, 39, and the latter can be operated as a pump.

The housing 37 contains four annular passages. A first annular passage 52 communicates with the pressure pipe 15 and a second annular passage 53 communicates with the discharge pipe 18, whilst the third and fourth annular passages 54 and 55 communicate with the connecting pipes 16 and 17. From left to right in the outer sleeve 45 are discharge bores 56, connecting bores 57 and 58, distributing bores 59, supply bores 60 and by-pass bores 61. The inner sleeve 46 contains discharge bores 62, longitudinal change-over grooves 63, 64 and 65, and annular groove 66, communicating with the latter grooves, and by-pass bores 67. Also provided in the housing are distributing bores 68, which, through passages 69 and 70, communicate with the spaces between the roots of the teeth on the toothed ring 39.

The following operating conditions are thereby achieved. In the neutral position, illustrated in FIG. 6, oil under pressure passes through the annular space 52 and the by-pass bores 61 and 67 into the inner space 71 whence it can discharge directly through the bores 62 and 56 and the annular space 53. If the inner sleeve 46 of the working motor 28, 29 is rotated to overcome the force of the spring 50, the by-pass bores 61 and 67 move gradually out of contact. Depending upon the direction of rotation, the connecting bores 57 and 58 move into contact with one of the change-over grooves 63, 64, adjacent distributing orifices 59 each move into contact with one of the change-over orifices 64 and 65. Consequently, the fluid under pressure flows from the annular groove 52 through the bores 60, the annular groove 66, the change-over grooves 65, the distributing bores 59 and 68, to the metering motor, and through parallel distributing bores 68 and 59 to change-over grooves 64, and from there, through the connecting bores 57 and 58 respectively to the working motor 22, and thence back to the annular space 53 by way of the change-over grooves 63. The direction in which fluid flows through the working motor depends upon the direction in which the inner sleeve 46 is rotated. The grooves 63 and 64, in conjunction with the connecting bores 57 and 58, therefore act as a change-over valve. As shown in FIG. 4, the distributing bores 59, together with the distributing bores 68, form a commutator valve, which provides for the chambers 40 of the metering motor 38, 39 being provided with fluid under pressure in the correct sequence and direction. In conjunction with the change-over grooves 64 and 65, provision is made for the direction of rotation of the metering motor to coincide with that of the working motor 28, 29, so that the outer sleeve 45 follows the rotation of the inner sleeve 46.

In the case of the embodiment described, the peripheral form of the toothed wheels and toothed rings of the working motor 28, 29 and of the metering motor 38, 39 of the second system, as well as of the metering motor of the first system are the same. All the parts can therefore be produced on the same machine in a rationalized manner. Only the width of the toothed elements 38 and 39 is larger.

What is claimed is:

1. A hydrostatic steering system comprising, a primary working motor adapted to be connected to a steering linkage, first and second control units each incorporating change-over and shut-off valve means and metering means, a steering wheel for actuating said first control unit, a control working motor for actuating said second control unit, first conduit means connecting said first metering means to said control working motor, and second conduit means connecting said second metering means to said primary working motor.

2. A hydrostatic steering system according to claim 1 wherein said control working motor is a rotary motor.

3. A hydrostatic steering system according to claim 1 wherein at least one of said metering means has step-up characteristics.

4. A hydrostatic steering system according to claim 1 wherein said first metering means has step-up characteristics.

5. A hydrostatic steering system according to claim 1 wherein said first metering means includes mechanical step-up gearing means.

6. A hydrostatic steering system according to claim 1 wherein one of said metering means is a gerotor with a star gear thereof having one tooth less than a fixed tooth ring thereof, said star gear having rotational and orbital movements relative to said fixed tooth ring, and rotatable means for actuating said star gear which rotates in synchronism with said rotational movement of said star gear.

7. A hydrostatic steering system according to claim 6 wherein the other of said metering means is constructed and operates in the same way as said one of said metering means.

8. A hydrostatic steering system according to claim 7 wherein said rotatable means is connected between said control working motor and said second metering means.

9. A hydrostatic steering system according to claim 1 including two pumping units connected respectively to said first and second metering means.

10. A hydrostatic steering system according to claim 9 including check valve means between one of said pumping units and said second metering means.

11. A hydrostatic steering system according to claim 10 including bridging conduit means between said first metering means and said primary working motor, said bridging conduit means having check valve means allowing flow only in the direction of said primary working motor.

References Cited

UNITED STATES PATENTS

| | | | |
|---|---|---|---|
| 2,918,135 | 12/1959 | Wittren | 60—52SX |
| 2,984,215 | 5/1961 | Charlson | 60—52SX |
| 3,059,717 | 10/1962 | Moyer et al. | 180—79.2 |
| 3,423,934 | 1/1969 | Mercier | 60—52S |
| 3,443,378 | 5/1969 | Monroe et al. | 60—52S |
| 3,452,543 | 7/1969 | Goff et al. | 60—52S |

EDGAR W. GEOGHEGAN, Primary Examiner

U.S. Cl. X.R.

180—79.2